M. H. WINSLOW.
TYPE RECORDING WEIGHING BEAM FOR SCALES.
APPLICATION FILED OCT. 19, 1916.
1,290,821.
Patented Jan. 7, 1919.
2 SHEETS—SHEET 1.
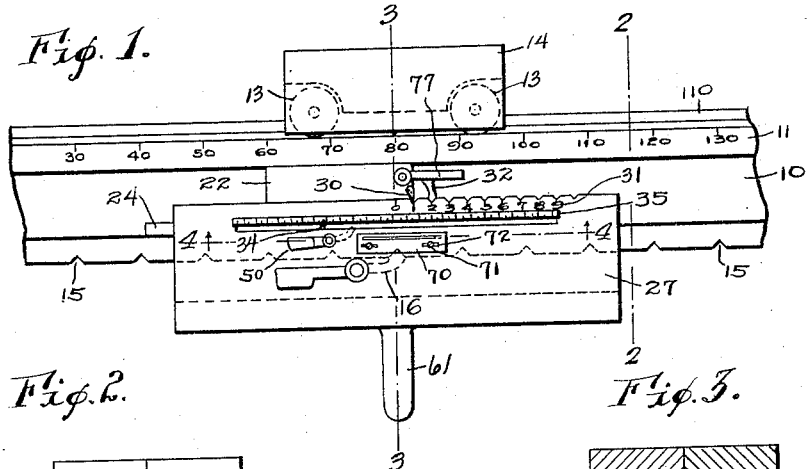
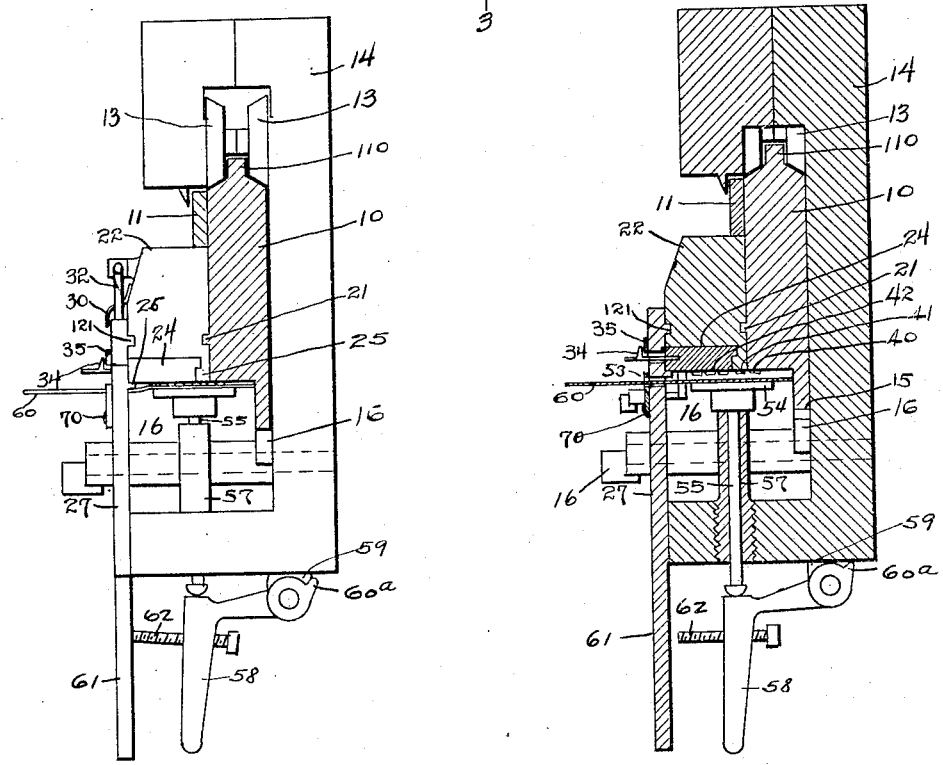
INVENTOR
MARLON H. WINSLOW
BY
Lockwood & Lockwood
ATTORNEYS

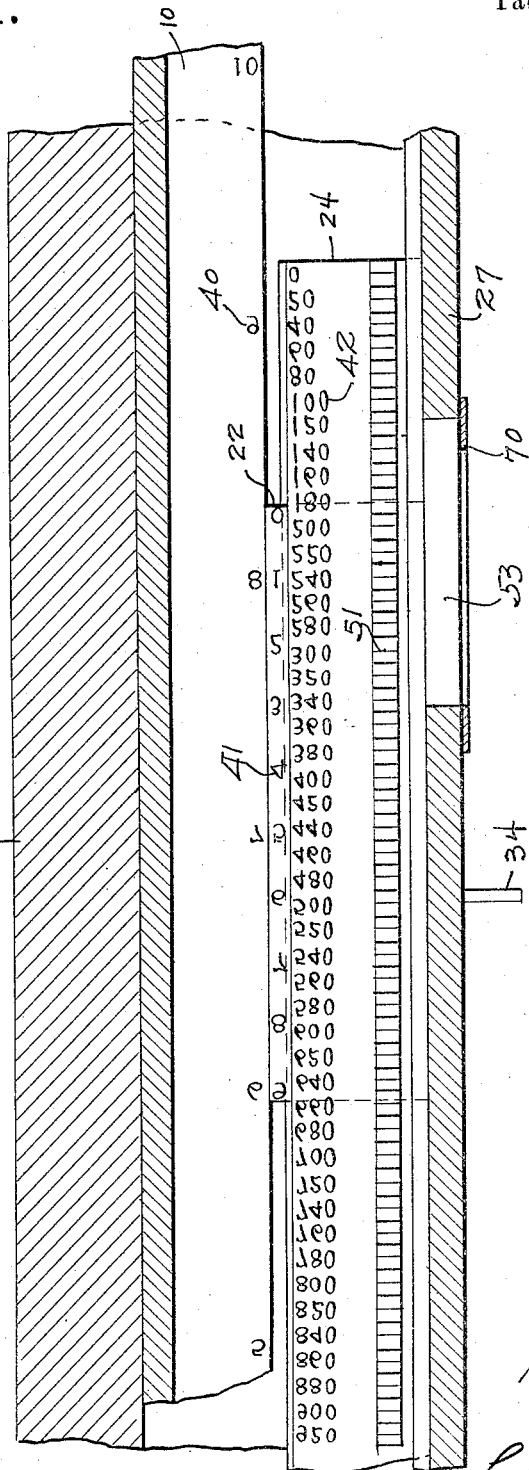

UNITED STATES PATENT OFFICE.

MARLON H. WINSLOW, OF TERRE HAUTE, INDIANA.

TYPE-RECORDING WEIGHING-BEAM FOR SCALES.

1,290,821. Specification of Letters Patent. Patented Jan. 7, 1919.

Application filed October 19, 1916. Serial No. 126,593.

*To all whom it may concern:*

Be it known that I, MARLON H. WINSLOW, a citizen of the United States, and a resident of Terre Haute, county of Vigo, and State of Indiana, have invented a certain new and useful Type-Recording Weighing-Beam for Scales; and I do hereby declare that the following is a full, clear, and exact description thereof, reference being had to the accompanying drawings, in which like letters refer to like parts.

The object of this invention is to improve the construction and operation of recording weighing devices or poises in weighing scales, preferably railroad or other scales for weighing heavy loads.

The chief feature of the invention consists in forming a poise of a plurality of members movable as a single poise on the scale beam and the members movable with relation to each other so as to weigh varying amounts and each poise member being provided with type or other printing means and the type of the various members being so associated as to be in alinement for printing the weight on the card or ticket.

The full nature of the invention will be understood from the accompanying drawings and the following description and claims:

In the drawings, Figure 1 is an elevation of a part of a scale beam with said poise thereon. Fig. 2 is a vertical section on the line —2 of Fig. 1, and showing the printing means in operation. Fig. 3 is a section on the line 3—3 of Fig. 1, showing the printing mechanism immediately previous to its operation. Fig. 4 is a section on the line 4—4 of Fig. 3.

There is shown herein a scale beam 10 of a railroad platform scale with a scale bar 11 secured thereto having on it numerals indicating thousands and each space between indicating marks representing tens of thousands. The upper edge 110 of said beam is reduced, as shown in Fig. 2, with a downwardly sloping surface on each side thereof to form a track for the anti-friction wheels 13 on the main poise 14. The lower edge of said beam is provided with notches 15 so as to be engaged by a gravity pawl 16 for centering and holding the poise in a manner well known.

A vertical front plate 27 is secured to the lower front edge of the main poise 14. A second poise 22 is slidable horizontally along the front surface of the scale beam 10 between said scale beam and the upper part of the plate 27, being held and guided in such movement by a rib 21 on the scale beam and rib 121 of the plate 27, which ribs project into corresponding recesses in the poise 22.

The second poise weighs thousands of pounds and is graduated, as shown in Fig. 1, from zero to nine to indicate in weight from zero to nine thousand. An indicator 30 is secured to the second poise 22 and moves along the graduated upper portion of the plate 27. The upper edge of the plate 27 has notches, as shown in Fig. 1, adapted to be engaged by a gravity pawl 32 secured on the second poise for centering and holding said poise in place, as usual.

A third poise 24 is horizontally slidable immediately below the second poise upon a flange 25 of the second poise and a flange 26 from plate 27. The third poise weighs hundreds, that is from zero to nine hundred and eighty pounds. A pointer 34 extends from the third poise through a horizontal slot in the plate 27 and points to a scale bar 35 on the front of said plate 27 and it has on it numerals for indicating the weight for said third poise, said numerals, however, not being here shown.

There is a row of type 40 on the underside of the main scale beam 10 with numerals located at suitable distances corresponding with the numerals on the scale bar 11. There is also a row of type 41 on the underside of the second poise 22 and in reverse position as compared with the numerals on the scale bar 31. The third poise 24 has on its underside three rows of type 42 representing units, tens and hundreds and representing every twenty pounds from zero to nine hundred and eighty pounds. The types on the poises transversely register with each other and are caused to do so by the means for centering and holding the poises in their adjusted positions. The third poise is held in such position by a gravity pawl 50 on the innerside of the plate 27 which engages the notches 51 on the underside of the poise, said notches appearing in Fig. 4.

The card 60 on which the weight is to be recorded is introduced through a slot 53 in the front plate 27 and rests upon a hammer plate 54 on the upper end of a push rod 55 which extends through a tube 57 screwed in the main poise 14 and operated vertically by an L-shaped lever 58 fulcrumed at one end to an ear 59 on the poise 14 and adapted when operated, to push upwardly said rod 55. A set screw 62 in said lever engages and limits the actuating movement of the lever so it will not cause the hammer plate to strike the type. The lever returns by gravity and its return movement is limited by a lug 68 thereon engaging the poise 14.

The operation of the device is as follows: When the load comes on the scale the main poise 14 is moved to the notch or scale numeral thereon nearest below the balancing position and that will give the tens of thousands of pounds. Then the second poise 22 is moved on the main poise to the notch and numeral next below its balancing position. That will give the thousands of pounds. Then the third poise is moved to the nearest balancing position. That will give the remaining pounds in units of twenty or any other units which may be desired. When the poises are all adjusted in balancing position, as desired, the record card 60 is inserted and the lever 58 operated, so that the type for the various poises will print or impress the weight on the card or ticket.

Often these tickets have two lines, one for the gross weight and another for the tare and when weighing the tare it is desirable to insert the same card which had been used to record the gross weight and on a line below the gross weight. Therefore, there is a card adjusting plate 70 provided, it being horizontally slidable on the front plate 27 by means of headed bolts 71 projecting through slots 72, as shown in Fig. 1.

In Fig. 4 the parts are in position for the insertion of a card and it will have printed on it the number "81,240", which is the weight at which the poises are set in Fig. 1. When the tare is being weighed, the card is inserted through the slot in plate 70 and said slot is pushed to the right as far as the slot 53 in the plate 27 will permit and that will cause the printing of the tare weight in a line below the printing of the gross weight. Then the net weight can be easily subtracted and written down on the card.

The operation of the lever 58 is improved by providing a bar 61 which is rigidly secured to a plate 27 and extends down therefrom substantially parallel with and rather close to the lower part of the lever 58 as seen in Figs. 2 and 3. This enables one by placing his hand around both the stationary bar 61 and lever 58, to operate the latter by drawing it toward the bar 61 and always to do so without giving to the mechanism, particularly poise 14 a swinging or other movement as would be the case if the bar 61 were not present. In such construction the set screw 62 abuts against bar 61 and limits the actuating movement of the lever 58.

The invention claimed is:

1. The combination of the scale beam of a weighing scale, a main poise member movable thereon, a second poise member mounted on and movable longitudinally of said main poise member, said second poise member having a bottom surface flush with the bottom surface of the beam, said bottom surfaces of the scale beam and second poise having type numerals adapted to register with each other in transverse rows, a vertically movable rod in said main poise member, a lever fulcrumed to said main poise member for vertically operating said rod, adjustable means for limiting the swinging movement of said lever in one direction, a plate carried by said vertical rod under said type whereby a card or ticket may be forced against the type for printing the total weight of the load, means to shift the same card for positioning it to receive the net weight, and gravity operated means for holding the poise members in adjusted position.

2. The combination of the scale beam of a weighing scale, a main poise member movable thereon, a second poise member mounted on and movable longitudinally of said main poise member, said second poise member having bottom surfaces flush with the bottom surfaces of the beam, the bottom surfaces of the scale beam and second poise having type numerals adapted to register with each other in transverse rows, a lever pivoted to the main poise for forcing a card or ticket against said type for printing the total weight of the load thereon, gravity operated pawls for holding said poise members in adjusted position, a bar rigidly connected with the main poise member and parallel with said lever for the hand to grasp while operating the lever, and adjustable means for limiting the movement of the lever toward said bar.

3. The combination of the scale beam of a weighing scale, a main poise member movable thereon, a second poise member mounted on and movable longitudinally of said main poise member, said second poise member having bottom surfaces flush with the bottom surfaces of the beam, said bottom surfaces of the scale beam and second poise having type numerals adapted to register with each other in transverse rows, a lever pivoted to the main poise for forcing a card or ticket against said type for printing the total weight of the load thereon, and a bar rigidly connected with the main poise member and parallel with said lever for the hand to grasp while operating the lever, and an adjustable stop for limiting the movement of the lever toward said bar.

In witness whereof, I have hereunto affixed my signature in the presence of the witnesses herein named.

MARLON H. WINSLOW.

Witnesses:
HORACE M. SMITH,
LAWRENCE H. BOYLE.

Copies of this patent may be obtained for five cents each, by addressing the "Commissioner of Patents, Washington, D. C."